(12) United States Patent
Ayoub (10) Patent No.: US 12,464,053 B2
(45) Date of Patent: Nov. 4, 2025

(54) AUTOMATICALLY DIRECTING CUSTOM COMPUTE OPERATIONAL FLOWS THROUGH A HETEROGENEOUS OVERLAY AND CLOUD COMPUTE INFRASTRUCTURE

(71) Applicant: Akamai Technologies, Inc., Cambridge, MA (US)

(72) Inventor: Khalil Ayoub, Ottawa (CA)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

(21) Appl. No.: 18/382,173

(22) Filed: Oct. 20, 2023

(65) Prior Publication Data

US 2025/0133059 A1     Apr. 24, 2025

(51) Int. Cl.
*H04L 67/563* (2022.01)
*H04L 65/613* (2022.01)

(52) U.S. Cl.
CPC .......... *H04L 67/563* (2022.05); *H04L 65/613* (2022.05)

(58) Field of Classification Search
CPC ............................ H04L 67/563; H04L 65/613
See application file for complete search history.

(56) References Cited

U.S. PATENT DOCUMENTS

| | | | |
|---|---|---|---|
| 6,711,607 B1* | 3/2004 | Goyal | G06F 9/505 718/105 |
| 7,133,905 B2 | 11/2006 | Dilley et al. | |
| 10,348,648 B2 | 7/2019 | Pignataro et al. | |
| 10,412,192 B2 | 9/2019 | Iqbal et al. | |
| 10,666,612 B2 | 5/2020 | Sundararajan et al. | |
| 10,735,528 B1* | 8/2020 | Shafiullah | H04L 67/75 |
| 10,949,233 B2* | 3/2021 | Connolly | G06F 9/45558 |
| 11,490,307 B2 | 11/2022 | Kanitkar et al. | |
| 2014/0359092 A1* | 12/2014 | Middleton | G06F 16/2471 709/221 |
| 2015/0215172 A1 | 7/2015 | Kumar et al. | |

(Continued)

FOREIGN PATENT DOCUMENTS

| | | |
|---|---|---|
| CN | 112153095 A | 12/2020 |
| CN | 112346877 A | 2/2021 |
| CN | 114844689 A | 8/2022 |

OTHER PUBLICATIONS

PCT/US2024/052228 International Search Report and Written Opinion mailed on Feb. 6, 2025, 6 pages.

*Primary Examiner* — Shirley X Zhang
(74) *Attorney, Agent, or Firm* — David H. Judson (57) ABSTRACT

A heterogeneous overlay network and cloud compute infrastructure comprises different tiers of PoPs that are configurable to provide different amounts of cloud computing. To facilitate the programming (configuration) of compute and caching operations throughout the heterogeneous network, a control mechanism and methodology are provided for automatically directing the flow of custom compute and caching operations using configurable "operations chains." A representative operation chain comprises a configuration file that specifies a traffic flow, and a set of operations and their relative ordering. A particular operation chain defines an initial operation that typically starts at a given edge machine in the heterogeneous network and then, as needed, one or more additional locations and their associated machines may then be used to facilitate processing of the operation chain.

20 Claims, 7 Drawing Sheets

(56) References Cited

U.S. PATENT DOCUMENTS

| | | |
|---|---|---|
| 2015/0222640 A1 | 8/2015 | Kumar et al. |
| 2016/0036886 A1* | 2/2016 | Ito .................... H04N 21/23439 709/219 |
| 2017/0257753 A1 | 9/2017 | Rasanen et al. |
| 2018/0115514 A1 | 4/2018 | Chou et al. |
| 2019/0132221 A1 | 5/2019 | Boutros et al. |
| 2021/0336839 A1 | 10/2021 | He |
| 2023/0168917 A1 | 6/2023 | Kavathia et al. |
| 2024/0394110 A1* | 11/2024 | Coviello ................. G06F 9/505 |

* cited by examiner

- if request is an image:
    - IVM operation chain (ghost edge operation, ghost parent operation, ghost supercache operation, IVM Linode operation)
- if request is a pdf:
    - ghost cache operation chain (ghost edge operation, ghost parent operation, customer miniPDF Linode operation)
- if request is for a security key:
    - ghost security key provider operation
- if request is a WRITE operation for a Linode DB:
    - linode DB operation
- else:
    - ghost cache operation chain (host edge operation, ghost parent operation, origin fetch operation)

FIG. 9

AUTOMATICALLY DIRECTING CUSTOM COMPUTE OPERATIONAL FLOWS THROUGH A HETEROGENEOUS OVERLAY AND CLOUD COMPUTE INFRASTRUCTURE

BACKGROUND

Technical Field

This application relates generally to managing traffic flows within a distributed networking environment.

Brief Description of the Related Art

Distributed computer systems are well-known in the prior art. One such distributed computer system is a "content delivery network" (CDN) or "overlay network" that is operated and managed by a service provider. The service provider typically provides the content delivery service on behalf of third parties (customers) who use the service provider's shared infrastructure. A distributed system of this type typically refers to a collection of autonomous computers linked by a network or networks, together with the software, systems, protocols and techniques designed to facilitate various services, such as content delivery, web application acceleration, or other support of outsourced origin site infrastructure. A CDN service provider typically provides service delivery through digital properties (such as a website), which are provisioned in a customer portal and then deployed to the network.

It is known to implement a CDN as a tiered network with different caching layers. In this approach, the different layers of caching include a lowest tier level that is often highly distributed across a large number of locations around the world, together with caching resources at somewhat fewer, more centralized higher tiers that are nearby, and eventually reaching an origin, the source of the pristine original item that is being cached. A representative approach of this type is described in U.S. Pat. No. 7,376,716, and this tiered distribution infrastructure is implemented in a commercial CDN service, e.g., from Akamai Technologies, Inc. of Cambridge, Massachusetts.

By way of further background, cloud computing is an information technology delivery model by which shared resources, software and information are provided on-demand over a network (e.g., the publicly-routed Internet) to computers and other devices. This type of delivery model has significant advantages in that it reduces information technology costs and complexities, while at the same time improving workload optimization and service delivery. In a typical use case, an application is hosted from network-based resources and is accessible through a conventional browser or mobile application. Cloud compute resources typically are deployed and supported in data centers that run one or more network applications, typically using a virtualized architecture wherein applications run inside virtual servers, or virtual machines (VMs), which are mapped onto physical servers in the data center. The virtual machines typically run on top of a hypervisor, which allocates physical resources to the virtual machines. Traditional cloud computing Points of Presence (POPs) are centralized hubs with a high level of computing infrastructure available to perform compute tasks. A representative cloud compute infrastructure is Linode® compute, also available as an Akamai® commercial service offering.

BRIEF SUMMARY

According to this disclosure, a heterogeneous overlay network and cloud compute infrastructure is provided. The approach herein extends the notion of a tiered network into the cloud computing realm in that the cloud compute infrastructure preferably comprises different tiers of PoPs that are configurable to provide different amounts of cloud computing. Thus, for example, smaller POPs are configurable to perform simpler cloud computing operations with less compute power, while larger POPs are configured to perform more challenging compute operations that need more compute power. The approach provides significant caching and compute capabilities throughout many locations, and to provide significant operational flexibility. To facilitate the programming (configuration) of compute and caching operations throughout the heterogeneous network, and according to a further feature of this disclosure, the techniques herein provide for a control mechanism and methodology for automatically directing the flow of custom compute and caching operations using configurable "operations chains." In one example embodiment, an operation chain is defined according to a programming language or schema. A representative operation chain comprises a configuration file that specifies a traffic flow, and a set of operations and their relative ordering. This traffic flow is sometimes referred to herein as operation chaining. A particular operation chain defines an initial operation that typically starts at a given edge machine in the heterogeneous network and one or more additional locations and their associated machines may then be used to facilitate processing of the operation chain. The operation chain encapsulates flow logic that takes into consideration an understanding of which POPs are capable of which operations, sending those operations to the correct (or appropriate locations) at correct (or appropriate) times, thereby directing the flow of traffic through the heterogeneous network. The approach herein maintains a proper flow of these operations as the network resources and/or conditions changes, e.g., as more or less compute or caching resources become available at different locations throughout the network.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter herein and the advantages thereof, reference is now made to the following descriptions taken in conjunction with the accompanying drawings, in which.

DETAILED DESCRIPTION

Figure 1:
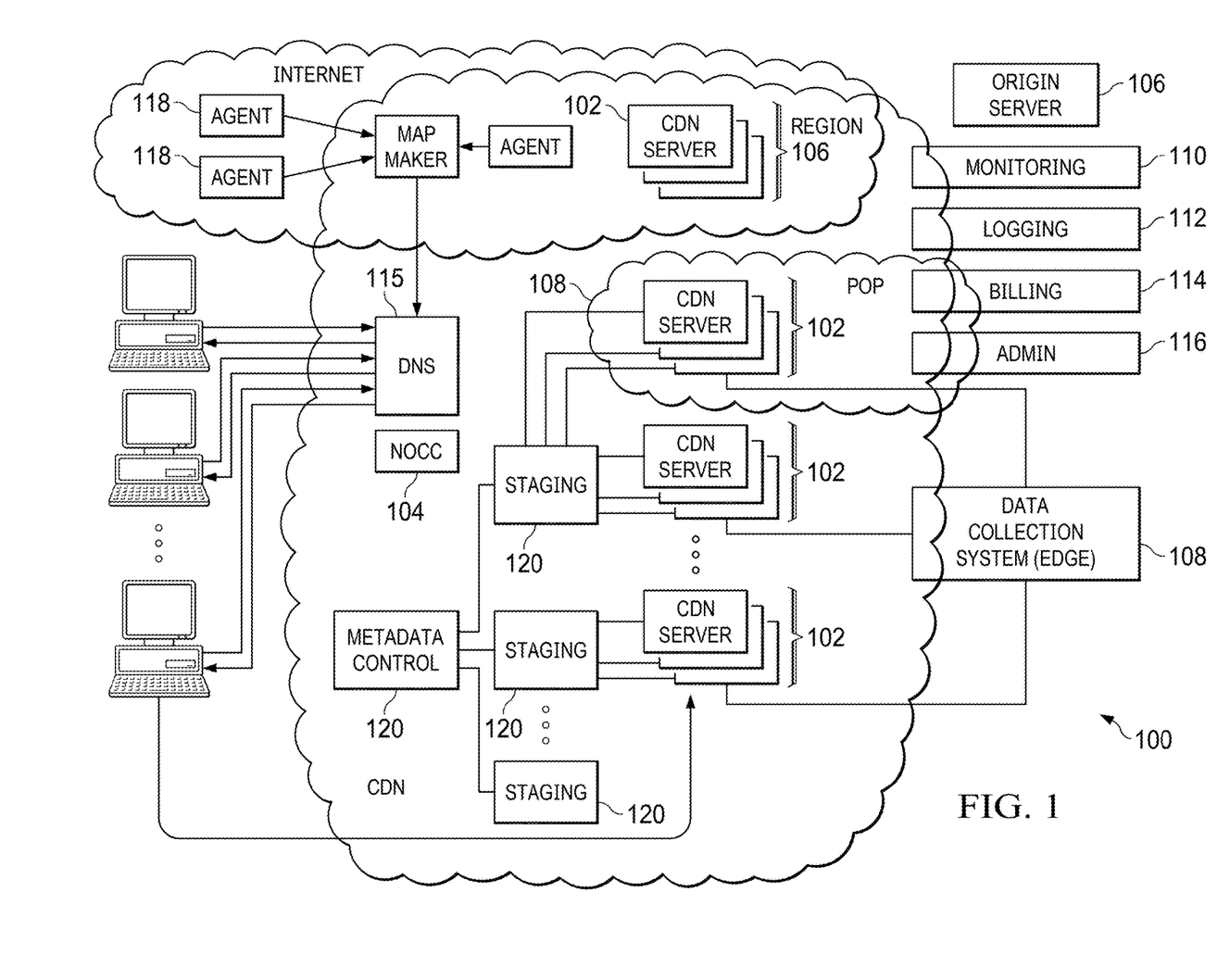
FIG. 1 is a block diagram illustrating a known distributed computer system configured as an overlay network, e.g., a content delivery network (CDN)

In a known system, such as shown in FIG. 1, a distributed computer system 100 is configured as a content delivery network (CDN) and is assumed to have a set of machines 102*a-n* distributed around the Internet. Generalizing, a CDN is a type of overlay network. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or sub-domains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 2:
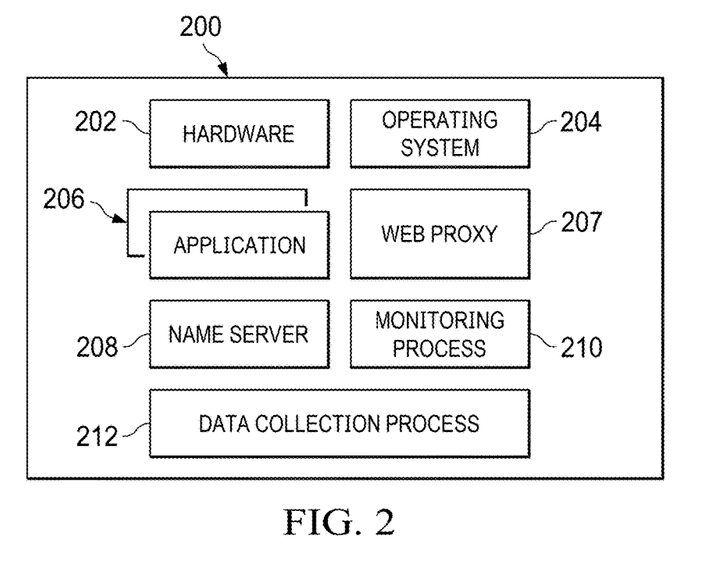
FIG. 2 is a representative CDN edge machine configuration.

As illustrated in FIG. 2, a given machine 200 comprises commodity hardware (e.g., an Intel Pentium processor) 202 running an operating system kernel (such as Linux or variant) 204 that supports one or more applications 206*a-n*. To facilitate content delivery services, for example, given machines typically run a set of applications, such as an HTTP proxy 207 (sometimes referred to as a "global host" process), a name server 208, a local monitoring process 210, a distributed data collection process 212, and the like. For streaming media, the machine typically includes one or more media servers as required by the supported media formats.

A CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

The CDN may include a storage subsystem, such as described in U.S. Pat. No. 7,472,178, the disclosure of which is incorporated herein by reference.

The CDN may operate a server cache hierarchy to provide intermediate caching of customer content; one such cache hierarchy subsystem is described in U.S. Pat. No. 7,376,716, the disclosure of which is incorporated herein by reference.

The CDN may provide secure content delivery among a client browser, edge server and customer origin server in the manner described in U.S. Publication No. 20040093419.

As an overlay, the CDN resources may be used to facilitate wide area network (WAN) acceleration services between enterprise data centers (which may be privately-managed) and third party software-as-a-service (SaaS) providers.

In a typical operation, a content provider identifies a content provider domain or sub-domain that it desires to have served by the CDN. The CDN service provider associates (e.g., via a canonical name, or CNAME) the content provider domain with an edge network (CDN) hostname, and the CDN provider then provides that edge network hostname to the content provider. When a DNS query to the content provider domain or sub-domain is received at the content provider's domain name servers, those servers respond by returning the edge network hostname. The edge network hostname points to the CDN, and that edge network hostname is then resolved through the CDN name service. To that end, the CDN name service returns one or more IP addresses. The requesting client browser then makes a content request (e.g., via HTTP or HTTPS) to an edge server associated with the IP address. The request includes a host header that includes the original content provider domain or sub-domain. Upon receipt of the request with the host header, the edge server checks its configuration file to determine whether the content domain or sub-domain requested is actually being handled by the CDN. If so, the edge server applies its content handling rules and directives for that domain or sub-domain as specified in the configuration. These content handling rules and directives may be located within an XML-based "metadata" configuration file.

Because the CDN infrastructure is shared by multiple third parties, it is sometimes referred to herein as a multi-tenant shared infrastructure. The CDN processes may be located at nodes that are publicly-routable on the Internet, within or adjacent nodes that are located in mobile networks, in or adjacent enterprise-based private networks, or in any combination thereof.

As used herein, an "edge server" refers to a CDN (overlay network) edge machine or server process used thereon. Typically, a "region" is a set of edge servers that are co-located with one another in some physical location (e.g., a network data center rack, a set of co-located machines, etc.).

Figure 3:
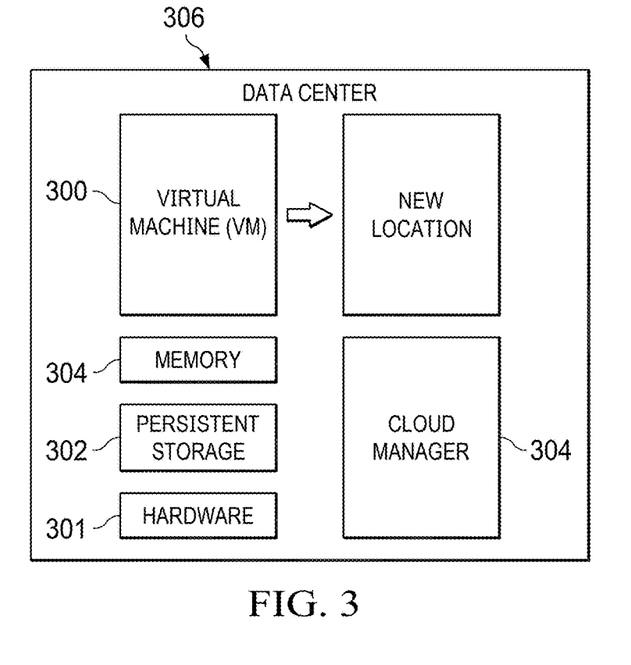
FIG. 3 depicts a representative virtual machine (VM) operating environment in a data center of a cloud compute infrastructure.

FIG. 3 depicts a data center operated by a virtual machine (VM) hosting provider. As noted above, a representative provider of this type is Linode®.

A representative VM in this type of known infrastructure is depicted in FIG. 3. The VM 300 has associated therewith persistent storage 302, the amount of which typically varies based on size and type, and memory (RAM) 304. The local persistent storage typically is built on enterprise-grade SSDs (solid state disks). The VM's persistent storage space can be allocated to individual disks. Disks can be used to store any data, including the operating system, applications, and files. A representative VM is equipped with two (2) disks, a large primary disk used to store the OS distribution (typically Linux), software, and data, and a smaller swap disk, which is used in the event the VM runs out of memory. While two disks are typical, the VM can be configured to have many more disks, which can serve a variety of purposes including dedicated file storage or switching between entirely different Linux distributions. When multiple disks are added to a VM, configuration profiles are used to determine the disks that are accessible with the VM is powered on, as well as which of those disks serves as a primary root disk. Using tools provided by the service provider, disks can be created, resized, cloned and deleted. In addition, and by using a cloud manager 304, the VM can be migrated to another data center (if the provider operates multiple data centers), or to another location within the data center 306.

As further background, edge compute capability may be supported in an edge network such as depicted in FIG. 1 according to one or more known techniques, such as disclosed in U.S. Pat. No. 7,254,634. According to that technique, a content delivery network (CDN) is provided with a distributed application framework, and an application executing in the framework can create, access and modify state for each client. Over time, a single client may desire to access a given application on different CDN edge servers within the same region and even across different regions. Each time, the application may need to access the latest "state" of the client even if the state was last modified by an application on a different server. A difficulty arises when a process or a machine that last modified the state dies or is temporarily or permanently unavailable. The approach described provides a technique for migrating session state data across CDN servers in a manner transparent to the user. In this way, a distributed application accesses a latest "state" of a client even if the state was last modified by an application instance executing on a different CDN server, including a nearby (in-region) or a remote (out-of-region) server.

Another known technique is described in U.S. Pat. No. 7,660,896, which provides a method and system of load balancing application server resources operating in a distributed set of servers. In a representative embodiment, the set of servers comprise a region of a content delivery network. Each server is the set typically includes a server manager process, and an application server on which edge-enabled applications or application components are executed. As service requests are directed to servers in the region, the application servers manage the requests in a load-balanced manner, and without any requirement that a particular application server be spawned on-demand.

Another known technique is described in U.S. Pat. No. 7,467,233. This patent describes a method for processing an application on an edge server, wherein the application comprises a set of defined presentation, code and data components, each of which are preferably URI-addressable objects. In response to a client request, the presentation, code and data components are processed according to a set of metadata to generate a response, and the response is delivered to the client. The presentation components are typically content such as HTML fragments, WML fragments, or some combination thereof. The code components are typically Java servlets or beans, XSLT style sheets, or some combination thereof. The data components are typically XML files, native database formatted files, and the like. Each of the presentation, code and data components may have a distinct management profile, cache-ability profile, deployment profile, invalidation profile, and security profile. These profiles are settable via metadata or other similar means. Using this framework, heterogeneous components may be composed into other components and complete applications or services that are provided from the edge server.

Figure 4:
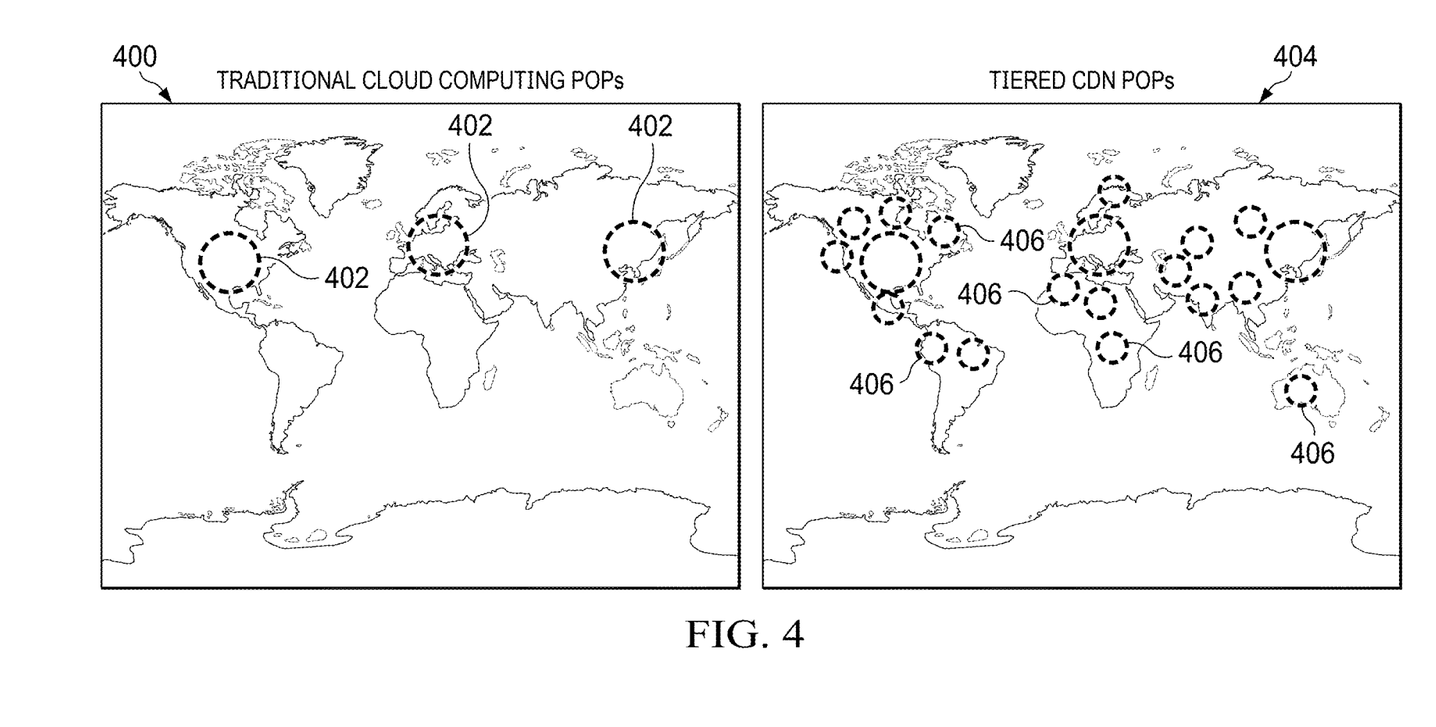
FIG. 4 depicts the typical manner in which traditional cloud computing POPs and tiered CDN POPs are distributed.

As still further background, FIG. 4 depicts a typical way in which traditional cloud computing POPs and tiered CDN POPs are distributed. As shown at 400, the traditional cloud computing POPs 402 are relatively few in number and are located at centralized locations (e.g., an Internet Exchanges or IXCs). In contrast, and as shown at 404, a typical CDN is much more highly distributed and comprises additional POPs 406, each of which typically houses a set of edge machines (e.g., FIG. 2) such as were described above, and with caching tiers.

With the above as background, the techniques of this disclosure are now described.

Heterogeneous Compute and Overlay Network with Custom-Configurable Flow Control

As explained above, the approach herein extends the notion of a tiered network into the cloud computing realm. To this end, the cloud compute infrastructure preferably comprises different tiers of PoPs that are configurable to provide different amounts of cloud computing. Thus, for example, smaller POPs are configurable to perform simpler cloud computing operations with less compute power, while larger POPs are configured to perform more challenging compute operations that need more compute power. The approach provides significant caching and cloud compute capabilities throughout many locations, and provide significant operational flexibility for the service provider, and for the service provider's customers.

As will be described further, and to facilitate the programming (configuration) of compute and compute operations throughout the heterogeneous network, the techniques herein provide for a control mechanism and methodology for automatically directing the flow of custom compute and caching operations using configurable "operations chains." Preferably, an operation chain is defined according to a programming language or schema. A representative operation chain comprises a configuration file that specifies a traffic flow, and a set of operations and their relative ordering. This traffic flow is sometimes referred to herein as operation chaining. A particular operation chain defines an initial operation that typically starts at a given edge machine in the heterogeneous network, and optionally one or more additional locations and their associated machines that are then used to facilitate processing of the operation chain. The operation chain encapsulates flow logic that leverages an understanding of which POPs are capable of which operations, and then sending those operations to the correct (or appropriate locations) at correct (or appropriate) times, thereby directing the flow of traffic through the heterogeneous network. Preferably, an operation in an operation chain is associated with or defined by a Uniform Resource Locator (URL), typically having a service provider-specific hostname. The CDN mapping system is configured to receive and process those hostnames into one or more Internet Protocol (IP) addresses the identify one or more POPs, or machines/hosts therein, and at which an operation in the chain will be carried out. Further, the approach herein maintains a proper flow of these operations as the network resources and/or conditions changes, e.g., as more or less compute or caching resources become available at different locations throughout the network.

Figure 5:
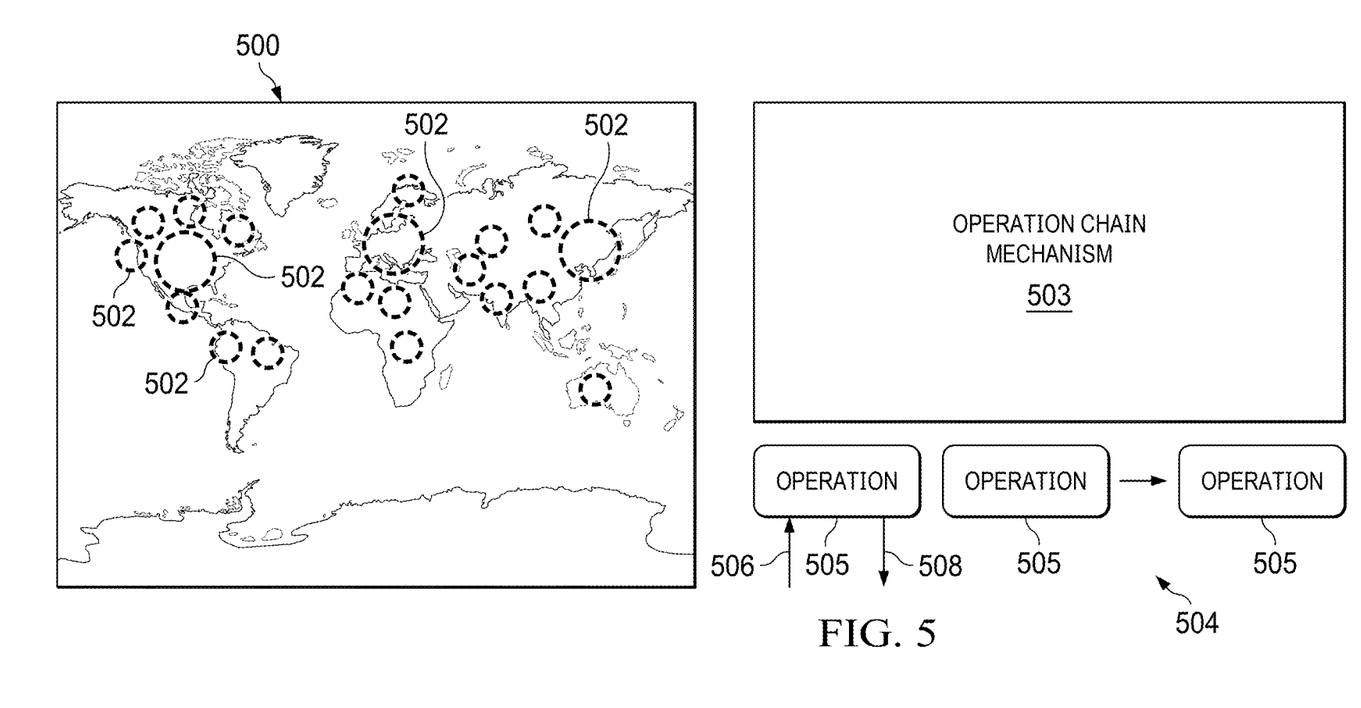
FIG. 5 depicts a heterogeneous caching and compute network in which operation chaining is implemented through operation chains.

FIG. 5 depicts a heterogeneous compute and overlay network 500 in which the techniques of this disclosure are practiced. The network 500 includes different tiers of POPs throughout, and wherein tiers of POPs are configurable to provide caching hierarchies, as well as cloud compute hierarchies. Without intending to be limiting, and in a manner similar to the way CDNs include tiered cache hierarchies, the different compute POPs (e.g., POPs 502) are configured with different amounts of cloud computing resources. A cloud compute POP 502 provides on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. Typically, the amount of cloud compute available from a particular POP typically is variable e.g., depending on the nature, extent and availability of the one or more computing resources, although this is not a requirement, as the amount of cloud compute available from a particular POP may also be fixed and unchanged over some time period. Different POPs may have the same or substantially the same cloud compute resources (or any of them) but provide different compute capability based on their configuration or other provisioning or orchestration options. Alternatively, different POPs have different compute resources (or any of them), and the available cloud compute power then depends on the available compute resources at a given POP. In a typical operating scenario, compute machines (hosts) are configured to be spun-up (started) as needed within a given POP, such that the compute capability may scale dynamically within that POP.

According to this disclosure, the cloud computing and caching operations ("operations") are configurable via the operation chaining. In a typical operating scenario, operating chaining is controlled via an operation chain mechanism 503, wherein a chain 504 comprises a set of operations 505. An operation can be executed in a specific subset of one or more POPs with the heterogeneous network 500. Each operation 505 expects some input 506, and it provides an output 508. Chains of operations are created to define a set of operations to execute in a particular order or sequence (i.e., in "series") to obtain an end results. Typically, operations in the set are carried out sequentially, i.e., one after the other, but this is not a limitation, as there may be operation chains that comprise operations that execute concurrently or in "parallel." As an example of a typical series operation, the operation chain 504 is configured to check in a Tier 1 cache (a first operation), before another operation checks in a Tier 2 cache (a second operation), before a final operation generates a response that is returned by the network. According to a further aspect of this disclosure, any operation in an operation chain can return an output that bypasses all or some remaining portion of the chain. This "direct response" or "discrete response" is an example of an operation.

Figure 6:
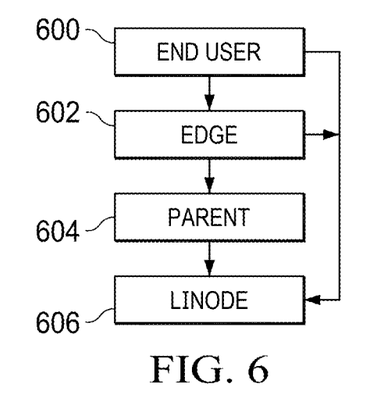
FIG. 6 depicts a representative use case for the techniques of this disclosure in a heterogeneous compute and overlay network, and in particular wherein a cloud compute instance is used as an external service provider in association with an overlay network tiered caching infrastructure.

An example of a basic operation flow is depicted in FIG. 6. In this example, an end user 600 is interacting initially with an overlay network edge machine 602. Conventional CDN technologies such as described above are used to associate the end user 600 with the edge machine 602. The edge machine 602 is a component of a tiered cache hierarchy in the overlay that includes a parent machine 604. According to this disclosure, the heterogeneous network also comprises a compute machine 606, which in this example may provide a compute function, e.g., that takes a code snippet, compiles it into a container, receives an input, executes the snippet against the input, and generates a result. Continuing with this example, the operation chaining comprises a cache operation chain 608, such as: "if request is for compute function X: {edge operation, parent operation, Linode customer-hosted compute function}." The customer-hosted compute function is an operation that receives a request and executes, and it provides the response. It may be implemented via an OCI (Docker) container that implements a service provider-based or customer-specific Application Programming Interface (API), and that executes the code snippet written in a common programming language or in a customer-specific language. As depicted in FIG. 6, the cloud compute node at which the customer-hosted compute function is implemented receives the request (i.e., is called) in one of several ways depending on cacheability (see the arrows): from the edge machine 602, or from the parent machine 604. As also depicted, the end user may also interact directly with the compute machine 606, thereby avoiding the cache hierarchy. As noted above, typically the compute machine 606 is configured into a compute node that is a POP.

Generalizing, the POP in this example is one of a set of compute POPs in the heterogeneous network. POPs correspond to the locations in which caching and/or computing is executed. As noted above in FIG. 5, many POPs have different computing and caching capabilities and are widely distributed in a geographic sense. The heterogeneous network of this disclosure is the set of the POPs throughout the world working together to provide end users with a programmable and cacheable computing platform in which to operate, preferably by leveraging the operation chaining. The heterogeneous network includes a Domain Name System (DNS) mechanism, typically with multiple hierarchical levels, to respond to DNS queries directed to operation names associated with or encoded within URLs. An operation in an operation chain may be provided by a third party (such as the container-based compute function in the example in FIG. 6), created and implemented by the service provider (e.g., such as an edge cache hierarchy operation), created as a custom operation by an end user, or otherwise. Preferably, an operation is defined according to a programming language or schema. For example, and without limitation, a given scheme that defines an operation may contain tags, name/value pairs, or other data fields that define the operation, the components used, operating costs, which types of machines are capable of performing the operation, and so forth. In a representative scenario, an entity (e.g., an end user, the service provider, a customer, a third party, or otherwise) defines an operation chain that is desired to be executed. Not all of the execution must occur within the heterogeneous network. The operation chain may comprise a set of operations and how those operations will be used. As noted above, the operation chain may include a set of operations that are to be executed in series, in parallel, in combination (series and parallel), as branching operations chains, and so forth, all as needed. In one embodiment, the operation chain is configured as custom code that is bundled as its own operation in order to be executed within the network. During this bundling of the operation chain, a set of one or more primary operation tags are defined, and these tags (when resolved by DNS) determine which of one or more of the set of POPs are to be the entry point(s) within the network for the chain, or for some operation within the chain. The operation chain may also specify a maximum set of POPs that are to be configured to handle the operation and that are expected to provide the best end user experience. The particular information specified in an operation chain may be cached for re-use, e.g., as a DNS entry. When a particular tag (as noted above typically a URL) in the operation chain is then processed, the DNS entry returns all POPs that can handle the level of compute, caching and operating time necessary for the operation. A particular DNS entry thus defines an association of a tag and one or more POPs. As compute or cache resources within a POP vary, the DNS entry may be updated or changed. A custom set of POPs with dedicated computing capabilities to perform a specific operation may have a custom DNS entry, and the access to that entity may be restricted based on an access control.

Preferably, the bundling process produces (or re-uses) DNS entries for all (or some defined subset of) operations that are possible within a given operation chain. As noted above, an operation within the chain may require a different set of POPs with different sets of capabilities. When processed, these DNS entries may return a dynamic set of POP addresses based on one or more factors, such as location of the originating request, loads on machines, security or other policies, time-of-day, bandwidth or other communication costs, and the like.

Figure 7:
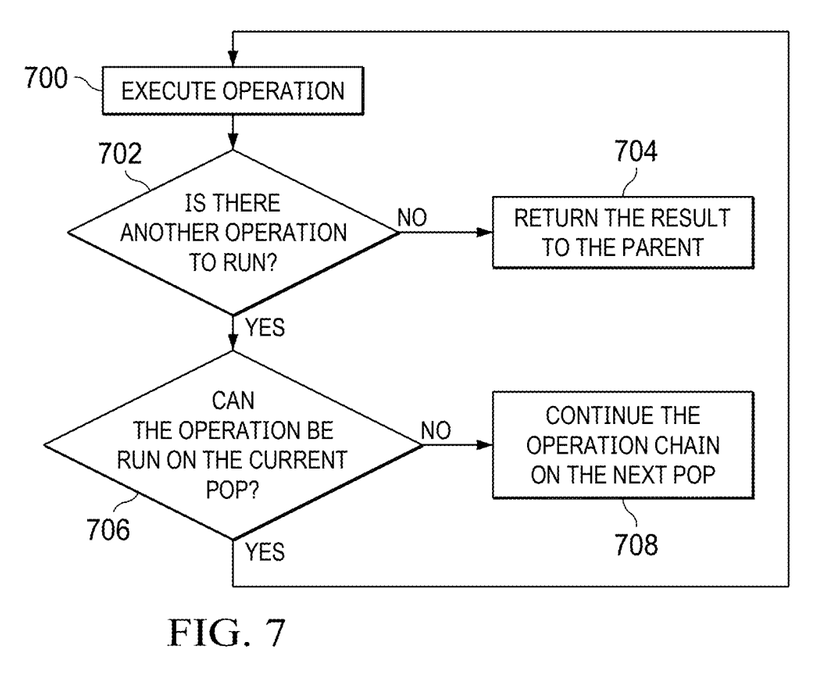
FIG. 7 depicts a simple process flow of a decision-making process when executing operations on a POP according to the techniques of this disclosure.

In a typical operating scenario, an operating chain is linear (each operation occurring, one after the other). In such case, and once an operation has begun executing within the network on a specific POP, each subsequent operation within the operation chain executes in order. Generally, and as long as the current POP is still capable of performing the operations (and unless there is requirement to move elsewhere), there is no need to move to another POP. That said, anytime the current POP is incapable of performing the next operation, the operation chain preferably is forwarded to the DNS entry of the next operation. This forwards the state of the operation chain and the point in the chain from which to continue. FIG. 7 depicts the basic operation flow in this context. In particular, the execution process begins at step 700 by executing the operation. When complete, a test is performed at step 702 to determine if there is another operation in the chain to run. If not, the result is returned, e.g., to the parent machine in the example scenario shown in FIG. 6. This is step 704. If, however, there is another operation in the chain, a test is performed at step 706 to determine if the next operation in the chain can be run on the current POP. If so, control returns to step 700. If, however, the next operation in the chain cannot be run on the current POP, control moves to step 708, and the operation chain is continued on the next POP (as determined by the DNS entry for an associated tag for the next operation). As POPs change in this manner (e.g., due to resource constraints or the like that occur at a POP), DNS entries are updated such that follow-on executions of the same operation chain may then execute in different POPs. This improves the performance for end users, as the changes reflected in the updated DNS entries and without having to re-create or modify the operation chain itself.

Figure 8:
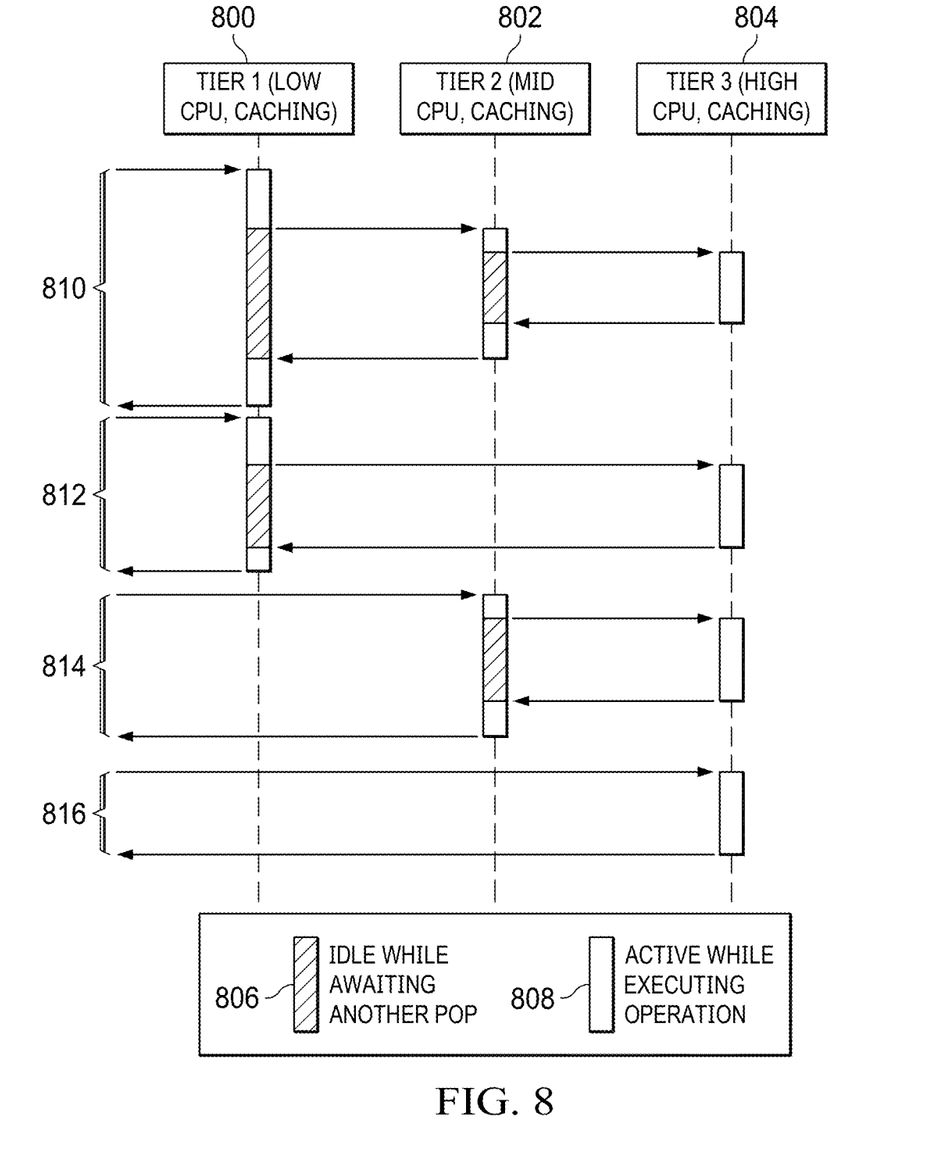
FIG. 8 depicts an example of the control technique herein with three (3) tiers of POPs, a first tier with low processing and caching capability, a second tier with medium processing and caching capability, and a third tier with high processing and caching capability.

FIG. 8 depicts example executions of an operation chain in a scenario where there are three (3) tiers of POPs, Tier 1 (low CPU, low caching) 800, Tier 2 (medium CPU and caching) 802, and Tier 3 (high CPU and caching) 804. As indicated by the legend, resources within the POP may be idle while awaiting another POP 806, or active while executing the operation 808. In a first example 810, the operation chain moves up tiers as operations require more resources. In the second example 812, the operation chain jumps to the highest tier early in the flow of execution. In the third example 814 the operation chain requires starting at a higher tier as the entry point. In the fourth example 816, the highest tier is the only available choice that can meet the processing requirements. In practice, real execution may have overlapping POPs with different resources and multiple requirements for provide a myriad of operational scenarios, from simple to complex.

Figure 9:
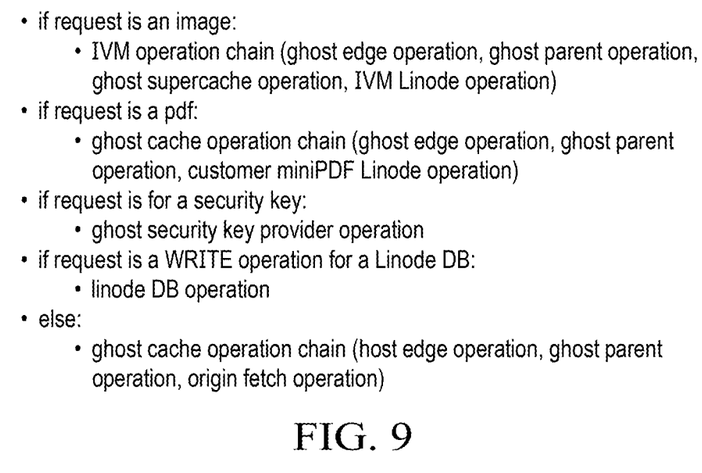
FIG. 9 represents example pseudocode of an illustrative operation chain.

FIG. 9 depicts an example operation chain syntax and grammar for a heterogeneous network comprising a combination of cloud computing and CDN POPs. A representative commercial service of this type is Akamai® Connected Cloud. In this operating environment, many operations may occur and are typically associated within a single property configuration, e.g., for a customer-specific hostname that implements a service such as content delivery. Instead of designing a property as a series of operations, the operation chain herein defines one or more conditions that execute behaviors within the flow of a single property. Typically, many behaviors can interact with the request but in some cases may interfere with one another.

For example, assume that some of the operations that are all intermingled and configured to execute in an edge machine are instead configured as individual operations. For example, the CDN may provide a distributed serverless edge platform that enables user to deploy JavaScript functions at the edge to create customized experiences for the customer's website visitors. Typically, that functionality (e.g., Akamai EdgeWorkers®) is integrated with the CDN edge server (an HTTP proxy) and operates as a single operation (that executes on multiple tiers of caching). That service has an interface that allows the customer to programmatically decide how to handle request flow. According to this disclosure, those services are configured in an operation chain. Another example service provided by the CDN is an Image and Video Manager (IVM) that has multiple tiers of caching and an external service for performing image transformations. Here, that service is configured as an operation chain. As another example, assume a customer creates a custom origin in a Linode® compute instance is created that performs PDF compression, and that the function is leveraged by redirecting to it in cases where the URL looks like a PDF.

Taking these examples, which are not meant to be liming, and according to this disclosure, these and other features are extracted into simple operations, and appropriate operation chains are configured, e.g., with a simple configuration of a Layer 7 proxy. A web-accessible interface may be provided to facilitate this process. The resulting configuration (for these use cases) is depicted in FIG. 9, with "ghost" being a reference to the edge machine HTTP proxy. With this example, the flow of traffic is determined beforehand and while some operation chains are black boxes to the CDN customer end users, they contain even more operations that can each be run on different machines in the network. In the example, preferably all requests start out at a ghost machine in the network; then, and based on decisions made in that machine, the request may travel to different machines within the network. This was depicted in FIG. 8.

The example depicted in FIG. 9 provides significant benefits. In particular, it avoids the interactions between the various services as they use independent operations. There are many cases where IVM is placed in the property and then followed by something that changes the cache key for the image. Because ghost cache operation is an independent operation in the example, the IVM operation chain is not impacted by an independent ghost cache operation. Further, any EdgeWorker code implemented for the ghost cache operation is also independent, and a customer can write custom EdgeWorker code for the IVM operation chain.

In a variant embodiment, one or more of these operations are split to different endpoints. For example, all image requests may be configured to come into a specific operation chain, which would start at an optimal set of edge ghost machines (or perhaps directly to parent machines a request originates from within a metro cache). On the other hand, a write operation for a Linode DB cannot be cached and would go directly to the Linode endpoint closest to the end user.

The technique provides significant advantages. In particular, the solution allows operation chains requiring different levels of compute, caching, and operating time to execute on the correct POPs within a heterogeneous and changing network without complex knowledge of the network when programming those operation chains and without requiring changes to the code when the network itself changes after the fact.

Enabling Technologies

Generalizing, the techniques herein may be implemented in or in association with a computing platform, wherein one or more functions of the computing platform are implemented conveniently in a cloud-based architecture. As is well-known, cloud computing is a model of service delivery for enabling on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

The platform may comprise co-located hardware and software resources, or resources that are physically, logically, virtually and/or geographically distinct. Communication networks used to communicate to and from the platform services may be packet-based, non-packet based, and secure or non-secure, or some combination thereof. Typically, the cloud computing environment has a set of high level functional components that include a front end identity manager, a business support services (BSS) function component, an operational support services (OSS) function component, and the compute cloud components themselves.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, which provide the functionality of a given system or subsystem. As described, the functionality may be implemented in a stand-alone machine, or across a distributed set of machines. The functionality may be provided as a service, e.g., as a SaaS solution. An edge compute instance may be supported in a virtual environment.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. While given components of the system have been described separately, one of ordinary skill will appreciate that some of the functions may be combined or shared in given instructions, program sequences, code portions, and the like.

Preferably, the functionality is implemented in an application layer solution, although this is not a limitation, as portions of the identified functions may be built into an operating system (running TCP) or the like.

The functionality may be implemented with other application layer protocols besides HTTPS, such as SSL VPN, or any other protocol having similar operating characteristics.

The techniques herein may be used irrespective of the traffic type.

There is no limitation on the type of computing entity that may implement the client-side or server-side of the connection. Any computing entity (system, machine, device, program, process, utility, or the like) may act as the client or the server.

Finally, while given components of the system have been described separately, one of ordinary skill will appreciate that some of the functions may be combined or shared in given instructions, program sequences, code portions, and the like.

The techniques herein provide for improvements to a technology or technical field, namely, overlay networking, as well as improvements to the functioning of edge server itself, namely, by extending its conventional functionality as has been described.

The heterogeneous network may leverage local data collection techniques that include, without limitation, active and passive data collection, data traffic monitoring, packet inspection, application layer-based, operating system kernel-based, and otherwise.

The word "operation" should be construed as the performance of practical work or involving the practical application of methods, devices or systems. An operation may also referred to by other nomenclature, such as a primitive, a job, a unit of work, or the like.

Having described the subject matter herein, what is claimed is set forth as follows.

The invention claimed is:

1. A method operative in a heterogeneous network that comprises an overlay network, and a compute network, wherein resources associated with the overlay network and the compute network are hosted in a set of distributed locations, wherein given locations in the set of distributed locations have different amounts of compute power, comprising:
  configuring an operation chain that defines a set of operations and an execution sequence of the set of operations, wherein an operation is executable in a subset of one or more locations within the heterogeneous network;
  responsive to receipt of a request, processing the operation chain to identify a set of one or more locations that have compute and caching capabilities sufficient to execute the operation chain and return a response to the request;
  responsive to identification of the set of one or more locations, initiating execution of a first operation in the operation chain at a given entry point location;
  upon completion of the first operation, determining whether a next operation in the operation chain can be executed at the given entry point location;
  responsive to a determination that the next operation in the operation chain can be executed at the given entry point location, executing the next operation; and
  responsive to a determination that the next operation in the operation chain cannot be executed at the given entry point location, shifting execution of the operation chain to another location.

2. The method as described in claim 1, wherein the locations are Internet Points of Presence (POPs).

3. The method as described in claim 1, wherein an operation in the operation chain is associated with a Uniform Resource Locator (URL).

4. The method as described in claim 3, wherein processing the operation chain includes receiving a hostname associated with the URL, and identifying a DNS entry record that includes Internet Protocol (IP) addresses identifying the set of one or more locations.

5. The method as described in claim 4, wherein, responsive to shifting of the execution of the operation chain to another location, the DNS entry record is modified to reflect the shifting.

6. The method as described in claim 5, wherein upon receipt of a second request, the operation chain is processed using the modified DNS entry record.

7. The method as described in claim 1, wherein the operation chain is defined according to a programming language or schema.

8. The method as described in claim 1, wherein an operation in the operation chain has an associated operating cost and a type of machine that is configured to perform the operation.

9. The method as described in claim 1, wherein the operation chain requires different levels of compute or caching, and wherein the different levels are provided at different locations within the heterogeneous network.

10. The method as described in claim 1, wherein the operation chain defines a custom compute operation flow.

11. The method as described in claim 1, wherein upon execution of a given operation in the operation chain, a response is returned.

12. The method as described in claim 1, wherein the response is a direct response returned from a compute instance.

13. The method as described in claim 1, wherein the overlay network is a content delivery network (CDN).

14. The method as described in claim 1, wherein the operation chain identifies at least first and second locations in the heterogeneous network, and wherein the first and second locations differ from one another in at least one of: a compute capability, a caching capability, an execution time capability, and a combination thereof.

15. A computer program product comprising a non-transitory computer-readable medium, the computer-readable medium comprising computer program code executable in one or more host processing systems, the computer program code operative in association with a heterogeneous network that comprises an overlay network, and a compute network, wherein resources associated with the overlay network and the compute network are hosted in a set of distributed locations, wherein given locations in the set of distributed locations have different amounts of compute power, the program code configured to:
  provision an operation chain that defines a set of operations and an execution sequence of the set of operations, wherein an operation is executable in a subset of one or more locations within the heterogeneous network;
  responsive to receipt of a request, process the operation chain to identify a set of one or more locations that have compute and caching capabilities sufficient to execute the operation chain and return a response to the request;
  responsive to identification of the set of one or more locations, initiate execution of a first operation in the operation chain at a given entry point location;
  upon completion of the first operation, determine whether a next operation in the operation chain can be executed at the given entry point location;
  responsive to a determination that the next operation in the operation chain can be executed at the given entry point location, execute the next operation; and
  responsive to a determination that the next operation in the operation chain cannot be executed at the given entry point location, shift execution of the operation chain to another location.

16. The computer program product as described in claim 15, wherein an operation in the operation chain is associated with a Uniform Resource Locator (URL).

17. The computer program product as described in claim 16, wherein the program configured to process the operation chain further includes program code configured to receive a hostname associated with the URL, and to identify a DNS entry record that includes Internet Protocol (IP) addresses identifying the set of one or more locations.

18. The computer program product as described in claim 17, wherein the program code configured to receive the hostname and identify the DNS entry record is further configured to modify the DNS entry record responsive to shift of the execution of the operation chain to another location.

19. The computer program product as described in claim 18, wherein the program code configured to process to operation chain is responsive to receipt of a second request to continue processing the operation chain using the modified DNS entry record.

20. The computer program product as described in claim 15, wherein the operation chain is defined according to a programming language or schema.

* * * * *